US012610209B2

(12) United States Patent (10) Patent No.: US 12,610,209 B2
Kannan et al. (45) Date of Patent: Apr. 21, 2026

(54) NETWORK COMPUTER SYSTEM TO MANAGE CONGESTIONS

(71) Applicant: Uber Technologies, Inc., San Francisco, CA (US)

(72) Inventors: Priyaa Kannan, San Francisco, CA (US); Zubin Pahuja, San Francisco, CA (US); Ruslan Halavach, San Francisco, CA (US); John Lansing, San Francisco, CA (US); Timothy Escue, San Francisco, CA (US); Srinivas Singavarapu, San Francisco, CA (US); Andrew Strauss, San Francisco, CA (US); Catherine Civgin, San Francisco, CA (US); Christopher Duhaime, San Francisco, CA (US); Ruofei Wang, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 351 days.

(21) Appl. No.: 18/115,518

(22) Filed: Feb. 28, 2023

(65) Prior Publication Data

US 2024/0196167 A1 Jun. 13, 2024

Related U.S. Application Data

(60) Provisional application No. 63/432,307, filed on Dec. 13, 2022.

(51) Int. Cl.
*H04W 4/024* (2018.01)
*B60W 40/105* (2012.01)
*H04W 4/021* (2018.01)

(52) U.S. Cl.
CPC .......... *H04W 4/024* (2018.02); *B60W 40/105* (2013.01); *H04W 4/021* (2013.01)

(58) Field of Classification Search
CPC .... H04W 4/024; H04W 4/021; B60W 40/105
See application file for complete search history.

(56) References Cited

U.S. PATENT DOCUMENTS

| | | | | |
|---|---|---|---|---|
| 8,504,678 | B2 * | 8/2013 | Bishop | H04W 40/02 |
| | | | | 709/224 |
| 8,751,427 | B1 * | 6/2014 | Mysen | H04W 4/024 |
| | | | | 705/347 |
| 9,117,238 | B2 * | 8/2015 | Tapley | G06Q 10/047 |
| 9,143,926 | B2 * | 9/2015 | Egner | H04W 8/245 |
| 9,680,916 | B2 * | 6/2017 | Berk | H04L 67/1097 |

(Continued)

*Primary Examiner* — Hai V Nguyen
(74) *Attorney, Agent, or Firm* — Mahamedi IP Law LLP

(57) ABSTRACT

A network system obtains position information from a plurality of computing devices that are located within a geographic region where a mass-user facility is provided. A congestion level is determined for an area of the geographic region, based at least in part on the position information obtained from the plurality of computing devices. In response to determining that the congestion level exceeds a threshold level, the network system determines a target distribution profile for managing the use of multiple egress points by users within the geographic region to reduce the congestion level. Application content data can be transmitted to individual computing devices to cause corresponding users to use a corresponding of the multiple egress points, in accordance with the target distribution profile.

20 Claims, 4 Drawing Sheets

(56) References Cited

U.S. PATENT DOCUMENTS

| | | | |
|---|---|---|---|
| 10,039,112 B2 * | 7/2018 | Senarath | H04W 72/52 |
| 10,887,118 B2 * | 1/2021 | Senarath | H04M 15/8033 |
| 11,270,401 B2 * | 3/2022 | Shrivastava | H04W 4/33 |
| 11,346,685 B2 * | 5/2022 | Goluguri | H04W 4/44 |
| 11,543,824 B2 * | 1/2023 | Dyer | G08G 1/202 |
| 11,574,377 B2 * | 2/2023 | Monteil | G06Q 10/06315 |
| 11,574,378 B2 * | 2/2023 | Li | G06N 3/047 |
| 11,582,328 B2 * | 2/2023 | Cheng | H04L 67/62 |
| 11,601,553 B2 * | 3/2023 | Bohannon | H04L 67/306 |
| 11,669,786 B2 * | 6/2023 | Stayner | G06F 16/9035 |
| | | | 705/13 |
| 11,863,844 B2 * | 1/2024 | Iyer | H04N 21/8133 |
| 11,919,541 B2 * | 3/2024 | Nakamura | B60W 60/00253 |
| 11,961,404 B2 * | 4/2024 | Narayan | G01C 21/3438 |
| 11,972,681 B2 * | 4/2024 | Murphy | H04W 4/90 |
| 12,030,483 B2 * | 7/2024 | Maruiwa | B60W 30/06 |
| 12,065,075 B2 * | 8/2024 | Bandi | G06V 20/58 |
| 12,134,407 B2 * | 11/2024 | Vora | G06V 20/584 |
| 2006/0165040 A1 * | 7/2006 | Rathod | G06Q 10/10 |
| | | | 370/335 |
| 2007/0192176 A1 * | 8/2007 | Onischuk | G07C 13/00 |
| | | | 705/12 |
| 2007/0198702 A1 * | 8/2007 | Bishop | H04W 40/02 |
| | | | 709/224 |
| 2012/0296885 A1 * | 11/2012 | Gontmakher | G06Q 10/025 |
| | | | 707/E17.014 |
| 2014/0187274 A1 * | 7/2014 | Etchegoyen | G06Q 30/0201 |
| | | | 455/457 |
| 2014/0200036 A1 * | 7/2014 | Egner | H04W 8/245 |
| | | | 455/456.3 |
| 2015/0039719 A1 * | 2/2015 | Berk | H04L 67/10 |
| | | | 709/217 |
| 2016/0105893 A1 * | 4/2016 | Senarath | H04M 15/8022 |
| | | | 370/329 |
| 2016/0142328 A1 * | 5/2016 | Toy | H04L 47/26 |
| | | | 370/235 |
| 2017/0134907 A1 * | 5/2017 | Etchegoyen | H04W 4/029 |
| 2018/0048728 A1 * | 2/2018 | Paul | H04L 67/52 |
| 2018/0317230 A1 * | 11/2018 | Senarath | H04L 12/14 |
| 2019/0311629 A1 * | 10/2019 | Sierra | G06Q 10/02 |
| 2019/0325239 A1 * | 10/2019 | Meyer | G06V 20/59 |
| 2020/0111370 A1 * | 4/2020 | Dyer | G08G 1/202 |
| 2020/0120124 A1 * | 4/2020 | Ramamurthy | H04L 63/1425 |
| 2020/0149917 A1 * | 5/2020 | Goluguri | H04W 4/33 |
| 2020/0228880 A1 * | 7/2020 | Iyer | H04N 21/251 |
| 2021/0082079 A1 * | 3/2021 | Shrivastava | G06Q 90/205 |
| 2022/0076286 A1 * | 3/2022 | Rakshit | H04L 67/131 |
| 2022/0285012 A1 * | 9/2022 | Ebner | G06Q 50/163 |
| 2023/0421732 A1 * | 12/2023 | Tal | G08G 1/0141 |
| 2024/0212407 A1 * | 6/2024 | Baker | G07C 9/28 |
| 2024/0230347 A1 * | 7/2024 | Broyles | G01C 21/362 |

* cited by examiner

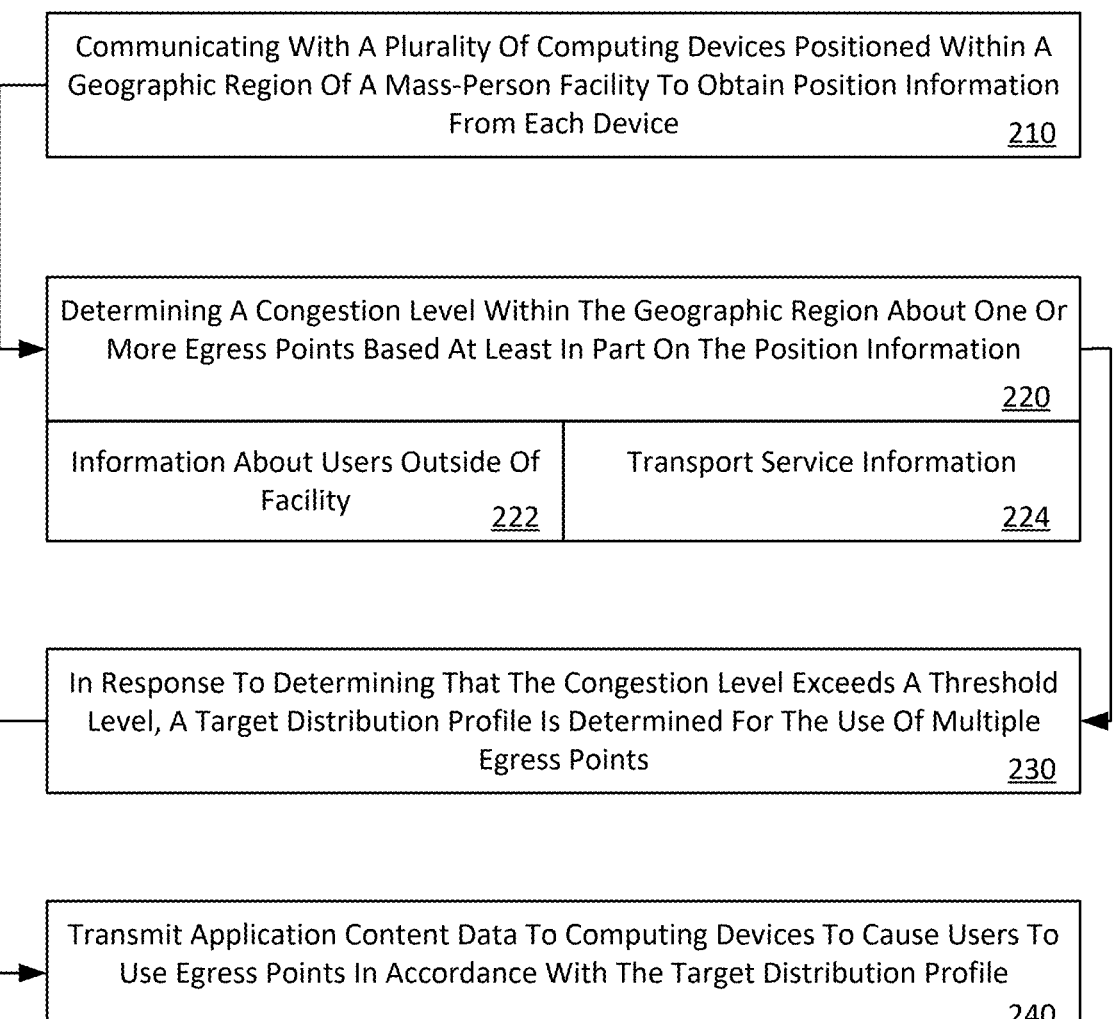

Communicating With A Plurality Of Computing Devices Positioned Within A Geographic Region Of A Mass-Person Facility To Obtain Position Information From Each Device          210

Determining A Congestion Level Within The Geographic Region About One Or More Egress Points Based At Least In Part On The Position Information          220

Information About Users Outside Of Facility          222

Transport Service Information          224

In Response To Determining That The Congestion Level Exceeds A Threshold Level, A Target Distribution Profile Is Determined For The Use Of Multiple Egress Points          230

Transmit Application Content Data To Computing Devices To Cause Users To Use Egress Points In Accordance With The Target Distribution Profile          240

FIG. 2

NETWORK COMPUTER SYSTEM TO MANAGE CONGESTIONS

CROSS-REFERENCE TO RELATED APPLICATIONS

This application claims the benefit of U.S. Provisional Patent Application No. 63/432,307, filed Dec. 13, 2022; the aforementioned priority application by incorporated by reference in its entirety.

TECHNICAL FIELD

Examples pertain to a network computer system to manage congestion in mass-person facilities.

BACKGROUND

Numerous on-demand services exist to offer users a variety of services: transportation, shipping, food delivery, groceries, pet sitting, mobilized task force and others. Typically, on-demand services leverage resources available through mobile devices, such as wireless (e.g., cellular telephony) devices, which offer developers a platform that can access sensors and other resources available through the mobile device. Many on-demand services include dedicated applications (sometimes referred to as "apps") to communicate with a network service through which an on-demand service is offered.

In airports, entertainment venues and other areas where high volume of persons are congregate, it is increasingly customary or typical for users to use on-demand services to request transportation services when leaving the area. In these settings, users look for convenience of avoiding parking. However, congestion amongst persons can develop to hinder the ability of users to exit the venue.

BRIEF DESCRIPTION OF FIGURES

FIG. 2 illustrates a method for managing congestion within or near a mass-person facility, according to one or more embodiments.

DETAILED DESCRIPTION

Figure 1:
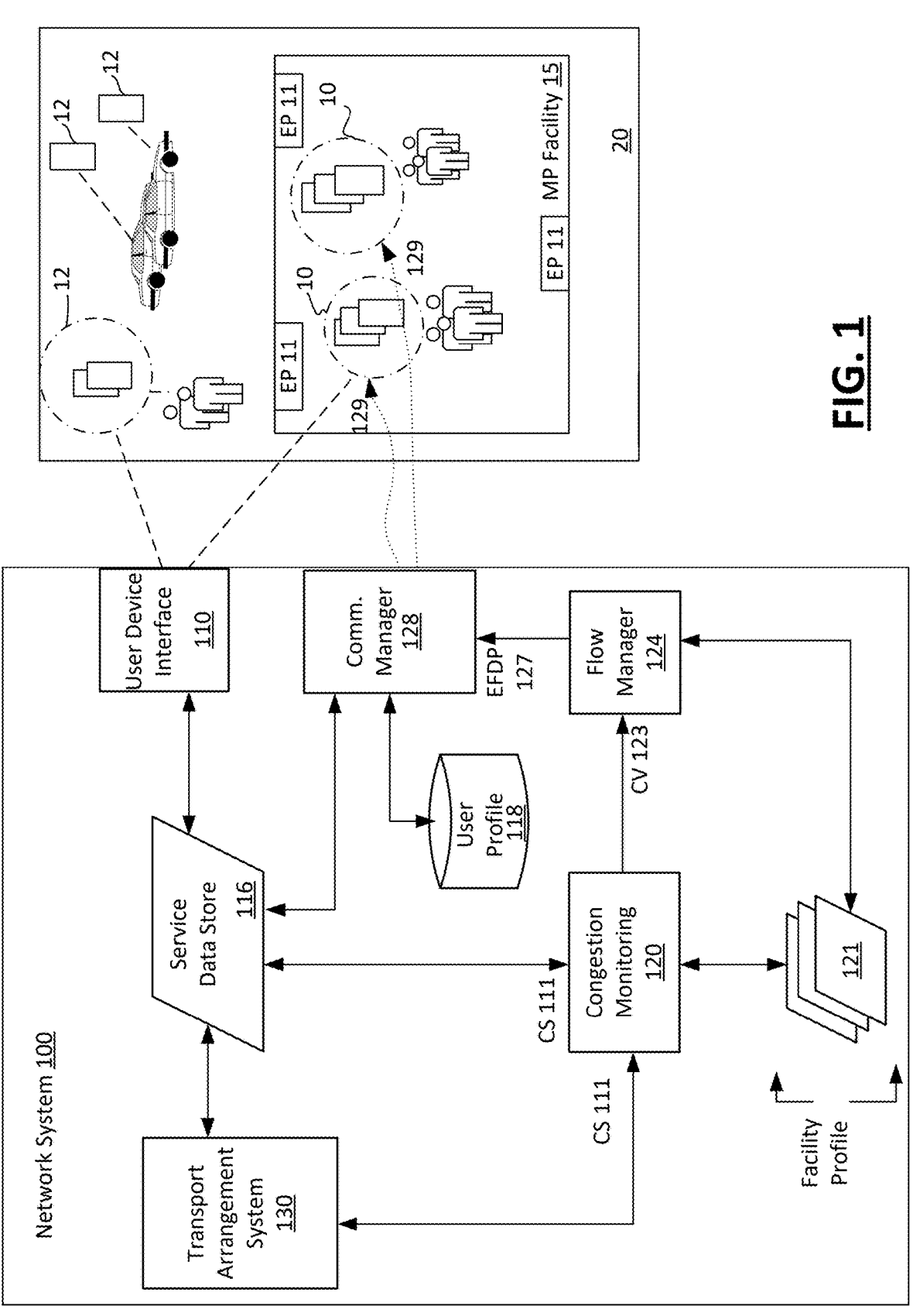
FIG. 1 illustrates an example of a network system for managing congestion at mass-person facilities, according to one or more embodiments.

According to examples, a network system communicates over one or more networks, with a plurality of computing devices positioned within a geographic region where a mass-person facility is located. The network system communicates to obtain position information from each of the plurality of computing devices. Each of the plurality of computing devices can be operated by a corresponding user of a plurality of users. A congestion level is determined for an area of the geographic region, based at least in part on the position information obtained from the plurality of computing devices. In response to determining that the congestion level exceeds a threshold level, a target distribution profile is determined for managing the use of multiple egress points by users within the geographic region, where the target distribution profile can be implemented to reduce the congestion level. Application content data, including notifications and/or other data, can be transmitted to individual computing devices to cause corresponding users of the respective computing devices to use one of the multiple egress points that is selected for that user in accordance with the target distribution profile.

In examples, a mass-person facility corresponds to a man-made development where people are located for a variety of purposes. Examples of facilities include transportation hubs (e.g., airports), a stadium, an event center, an amusement park, a movie theater or complex, or any other facility where a large number of persons can be present. In examples, a facility can include building, walkways, drive throughs, and combinations thereof.

An egress point can correspond to traversable structures of a facility, designed to allow people to exist the facility. In many examples, the egress point corresponds to an exit door from a building (e.g., airport terminal). In variations, the egress point can be a location where a user can rendezvous with a transportation service or provider (e.g., pickup line or "pickup zone" in an airport). Still further, in other examples, an egress point can correspond to a path, elevator or escalator.

As used herein, a client device, a computing device, and/or a mobile computing device refer to devices corresponding to desktop computers, cellular devices or smartphones, laptop computers, tablet devices, etc., that can provide network connectivity and processing resources for communicating with a service arrangement system over one or more networks. In another example, a computing device can correspond to an in-vehicle computing device, such as an on-board computer. Also, as described herein, a user can correspond to a requester of a network service (e.g., a rider) or a service provider (e.g., a driver of a vehicle) that provides location-based services for requesters.

Still further, examples described relate to a variety of location-based (and/or on-demand) services, such as a transport service, a food truck service, a delivery service, an entertainment service, etc., to be arranged between requesters and service providers. In other examples, the system can be implemented by any entity that provides goods or services for purchase through the use of computing devices and network(s). For the purpose of simplicity, in examples described, the service arrangement system can correspond to a transport arrangement system that arranges transport and/or delivery services to be provided for riders by drivers of vehicles who operate service applications on respective computing devices.

One or more examples described provide that methods, techniques, and actions performed by a computing device are performed programmatically, or as a computer-implemented method. Programmatically, as used, means through the use of code or computer-executable instructions. These instructions can be stored in one or more memory resources of the computing device. A programmatically performed step may or may not be automatic.

One or more examples described can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Some examples described can generally require the use of computing devices, including processing and memory resources. For example, one or more examples described may be implemented, in whole or in part, on computing devices such as servers, desktop computers, cellular or smartphones, and tablet devices. Memory, processing, and network resources may all be used in connection with the establishment, use, or performance of any example described herein (including with the performance of any method or with the implementation of any system).

Furthermore, one or more examples described may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example of a network system for managing congestion at mass-person facilities, according to one or more examples. In some examples, network system 100 is implemented as a platform that communicates with mobile computing devices 10, 12 of users to detect and manage congestion in within a geographic region 20 that includes a mass-person facility 15. By way of example, a mass-person facility 15 can correspond to an airport, a stadium, an event center, an amusement park, a movie theater or complex, or any other facility where a large number of persons can be present.

Various examples as described provide for a network system 100 to manage congestion at a mass-person facility 15, in connection with arranging transport from the facility. In such context, network system 100 facilitates implementation of a transport arrangement service, such that transport services can be more efficiently arranged from the mass-person facility without negative effects of congestion.

Among other advantages, examples provide for a network system 100 to detect congestion in a geographic region 20 of the mass-person facility, particularly at areas where egress is impeded. By way of example, too many users may line up to exist the mass-person facility 15 from a specific egress point 11. Examples recognize that in such scenarios, the congestion caused by persons exiting one egress point 11 over others can propagate to an area of the geographic region 20 that is outside of the facility 15. Additionally, the ability for users to rendezvous with transport provides is impeded. To mitigate against such occurrences, network system 100 operates to detect congestion when it occurs, and further implements exit flows for persons to exit the facility. The exit flows can be configured to distribute the movement of users from a small set of egress points 11 to a larger number. In particular, examples recognize that in mass-person facilities, users may select the closest egress point 11, unaware that another egress point 11 that is further from their current location may be more efficient for their needs.

By implementing exit flows when congestion arises, the network system 100 is able to mitigate against the negative affects of congestion near egress points of mass-person facilities. The negative affects can include vehicle congestion or inefficiency in the ability of users to arrange or receive transport services outside of the facility.

With reference to FIG. 1, network system 100 implements processes represented by user device interface 110, congestion monitoring component 120, flow manager 124 and communication manager 128. The user device interface 110 communicates with user devices 10, 12 to obtain position information of users within a geographic region 20, where the geographic region includes or overlaps with a mass-person facility 15. Based on the position information, the congestion monitoring component 120 estimates congestion levels at areas within or near the mass-person facility 15. The communication manager 128 can represent a service and/or processes that communicate application content data to the user computing devices 10, 12. Depending on examples, the communication manager 128 can be implemented as a same component as or different component than the user device interface 110.

The application content data can include data sets that are transmitted to individual devices 10, 12, to provide information about an egress point that is selected for the user. The information can include, for example, identification of a selected egress point, a route to a selected egress point, a distance or time until which the user reaches the egress point, and/or a current location of the user as compared to the location of one or more egress points. The application content data can cause receiving user devices 10, 12 to generate map content, messages, images, alerts and the like. In some examples, the application content data can be transmitted to the user devices 10, 12, to configure a user-interface of a service application running on that user device to integrate aspects of an available services (e.g., transport arrangement service) with information about a selected egress point to suggest, guide or direct users to select egress points. For example, a service screen of a service application can receive the application content data 129 to display an egress point for the user in combination with user-interface elements that enable the user to request transport services and/or view information about available transport services. In this way, the application content data 129 can guide or direct the user to a particular egress point, where the user can access or use a transport service.

In examples, the application content data can be transmitted as data flows that are received by, for example, a user-interface layer of a service application running on the user device 10, 12. In other examples, the application content data can be transmitted as or with notifications that are received by a service application. In variations, the communication manager 128 can transmit messages (e.g., SMS) that include application content (e.g., text, image, etc.) to individual user devices 10, 12, where the messages include information about the egress points selected for the user. Still further, in other variations, the communication manager 128 communicates a notification (e.g., a message) that includes a link which a component (e.g., browser) on the user device 10, 12 can use to access the application content data.

As described, in examples, if the congestion monitoring component 120 determines the congestion level to not exceed a threshold (e.g., no over-congested condition is present), the network system 100 can take no action for managing the flow of persons through the facility. As an alternative or variation, when an over-congested condition is not detected (e.g., congestion level below threshold level), the communication manager 128 can communicate egress points for users to utilize in order to facilitate their exit from the facility. For example, communication manager 128 can provide application content data 129 to users to identify the most proximate egress point to their current position. In such examples, the communication manager 128 can generate application content data 129 that, for example, identify the nearest exit door to the user, or the nearest pickup zone. Thus, when no overly congested condition is deemed present, communication manager 128 can generate application content data 129 that guides or controls users to exit the facility based on expediency.

If on the other hand, the congestion level is deemed to exceed a threshold value, the flow manager 124 can initiate operations that are intended to direct persons through the facility in a manner that reduces, or at least prevents worsening congestion. Thus, in some examples, when a congested condition is deemed present, the communication manager 128 can generate application content data 129 that identify egress points for individual users, based on a target distribution profile that is to ease the congestion of persons within the geographic region.

In some examples, the user device interface 110 includes, or otherwise utilizes an application programming interface (API), such as an externally provider-facing API, to communicate with user devices 10, 12, on which a corresponding service application is being communicated. By providing the externally facing API, the network system 100 establishes secure communication channels via secure access channels over the network through any number of methods, such as web-based forms, programmatic access via RESTful APIs, Simple Object Access Protocol (SOAP), remote procedure call (RPC), scripting access, etc.

The user computing devices 10, 12 represent computing devices of a population of users, located within the geographic region. Each user computing device 10, 12 can execute a service application to communicate with the network system 100. The users of computing devices 10, 12 can launch service applications when located within the mass-egress facility 15. For example, the individual users can launch the service application to request a service (e.g., transport service) provided by or with the network system 100. Alternatively, individual users can launch the service application in anticipation of requesting a service. For example, the user can launch the service application to determine a walking route or other information through the facility to reach a designated area where the user can request a transport service, be assigned a service provider or vehicle, and/or rendezvous with another party to receive transport.

By way of illustration, the mass-person facility 15 can correspond to an airport. A user can arrive at the airport by plane. Upon landing or disembarking from the airplane, the user can operate their respective device 10 to determine information such as the location of the baggage claim. Further, the user can open a service application to receive information and order services, such as a transport service. Through the service application, the user may be guided or provided navigational instructions to reach the baggage claim and/or designated area where the user can request transport and/or meet a driver. In the course of the user traversing the airport, the comping device 10 of the user can communicate position information to the network system 100 via the user device interface 110.

In examples, the user device interface 110 communicate with the computing devices 10, 12 of users within the geographic region 20 to receive position information. On computing devices 10, 12, the respective service applications can execute to automatically communicate their position information to the network system 100. On each computing device 10, 12, the position information can be determined by, for example, the service application interfacing with a geo-aware resource, such as a satellite receiver that receives satellite signals to determine its position information. In variations, the geo-aware resources of the user computing device 10, 12 can determine their respective position information through triangulation with cellular towers, through communication with beacons having known locations within the geographic region 20, and/or using other resources or techniques.

In this way, the user computing devices 10, 12 transmits their position information over one or more networks to the network system 100. The position information can include geographic coordinates (e.g., longitude and latitude). Additionally, the position information can include a time stamp to indicate when the respective computing device 10, 12 obtained the position information.

In examples, the user computing devices 10, 12 initially communicate account identifiers to the network system 100. Once an initial communication channel is established, the user computing devices 10, 12 can operate automatically to communicate their position information to the network system 100. Further, the user computing devices 10, 12 can communicate other information. As an example, the computing devices 10, 12 can communicate status information about the user (e.g., such as user-provided information). As another example, the computing devices 10, 12 can enable respective users to initiate, request or schedule transport services, in order to facilitate the users in leaving the facility.

Accordingly, in examples, the user device interface 110 communicate with computing devices 10, 12 to receive position information as users traverse through the mass-person facility 15 and/or surrounding geographic region 20. The user device interface 110 can record the position information of the computing devices 10, 12. For each user device 10, 12, the user device interface 110 can record, with the service data store 116, an identifier (e.g., account identifier associated with user of the device 10, 12), and position information. The position information can include a timestamp for when the position information was determined. In this way, the position information of individual devices 10, 12 within a given geographic region 20 can be repeatedly recorded with the service data store 116 over a given time interval. For example, the service data store 116 can include a record for each user computing device 10, 12 that is within the geographic region 20, where each record associates a given user identifier (e.g., account identifier) with a set of position information determined for that user over a current time interval.

In some examples, service data store 116 can be implemented as part of, or in connection with, a transport arrangement system 130. The users of the transport arrangement system 130 can include service providers and requesters. The requesters can correspond to users who are, or will be, leaving the mass-person facility. The service providers can correspond to users who provide transport services to leave the geographic region of the mass-person facility. In such examples, at least some of the user devices 10, 12 can include service provider devices. As described, the service data store 116 can record information about the service providers, including the current location of the service provider, and the service state (e.g., available, matched and enroute to pickup location, on-trip with passenger, etc.).

Accordingly, in examples, the transport arrangement system 130 includes processes that match requesters with service providers. When a user makes a transport request, the transport arrangement system 130 records the service parameters of the transport request, such as the pickup location and/or destination of the transport request. In some examples, the transport arrangement system 130 can identify the pickup locations of the transport requests. For example, the transport arrangement system 130 can determine that a given service request originates from within the geographic region 20. Based on the position information of the user within the geographic region 20, the transport arrangement system 130 can identify the pickup location (e.g., where the user should walk to in order to rendezvous with a driver and receive the transport service).

When a transport request is made by users through computing devices 10, 12, the transport arrangement system 130 can perform a series of operations to match the user to a service provider. The transport arrangement system 130 can update a record of the service data store 116 that is associated with the user to reflect the user has an open transport request. The transport arrangement system 130 can select a service provider based at least in part on the position information associated with the service provider. In some variations, service providers may also be associated with a queue position, and the transport arrangement system 130 can select the service provider based at least in part on their queue position. Still further, in some examples, the transport arrangement system 130 can invite or assign a suitable service provider to the transport request. When a suitable service provider is identified, the transport arrangement system 130 can inform the requester. Further, the transport arrangement system 130 can communicate information about the requester and the transport request (e.g., pickup location, destination, etc.) to the service provider. The transport arrangement system 130 can communicate with the computing device of the service provider to obtain position information of the service provider. The transport arrangement system 130 can use the position information to estimate a time of arrival (or duration until the service provider arrives at the pickup location).

In examples, the transport arrangement system 130 includes processes that record status information of users with the service data store 116. For requests, the status information can, for example, indicate (i) the user has made a transport request but has not yet been picked up (e.g., "open transport request"); (ii) the user's transport request has been assigned or matched to a service provider, but the requester has not yet been picked up (e.g., "awaiting pickup"); (iii) the user has been picked up, but has not yet reached their destination (e.g., "enroute"); and (iv) the user has reached their destination (e.g., "completed"). In some examples, the status information can include timing information, such as estimates of a time interval until the requesting user's status changes. For example, after the user is matched to a service provider, the transport arrangement system 130 can estimate the time until the service provider arrives at the pickup location. Further, the transport arrangement system 130 can track the position information of the service provider until the arrival of the service provider at the pickup location. The transport arrangement system 130 can record, with the service data store 116, the estimated time interval for the service provider to arrive at the pickup location, along with the status of the requester (e.g., awaiting pickup).

The transport arrangement system 130 can also include processes to record status information about service providers. By way of example, the transport arrangement system 130 can identify service providers who are available or unassigned, service providers who are matched and enroute to the pickup location, service providers who have arrived or picked up the requester, and service providers who are on-trip. Thus, the service data store 116 can include records of service providers who are providing, or available to provide transport services at the geographic region. As described, records stored with the service data store 116 can identify service providers and their position information (as communicated by their respective computing devices 10, 12). Further, in variations, the records of service providers can also include their status information, as well as time interval estimates until the service providers are expected to change status.

While some examples such as described with FIG. 1 illustrates the transport arrangement system 130 as being part of the network system 100, in variations, the transport system 130 can be external to the network system. In such variations, the network system 100 may include processes to communicate with the transport arrangement system 130 to determine information position information of service providers and/or status information of service providers and/or requesters. Further, with examples, the service status information of requesters and/or providers may be provided in aggregate.

Congestion Determination

In examples, the congestion monitoring component 120 can determine congestion levels with respect to one or more areas of the geographic region 20 where the mass-person facility 15 is located. The area(s) can be pre-determined, based on their relative location with respect to egress points of the facility. Alternatively, the area(s) can be dynamically determined through congestion monitoring and evaluation.

In examples, the congestion monitoring component 120 accesses the service data store 116 to aggregate the current position information of users within the facility at discrete time intervals. For example, the congestion monitoring component 120 can query the service data store 116 for position information of users every 1 minute, 2 minutes, 5 minutes, 10 minutes, hour, etc. Based on the aggregation, the congestion monitoring component 120 can determine a congestion level at specific regions or areas within or near the facility. In some examples, the congestion monitoring component 120 can determine a congestion level at specific regions or areas within or near points of egress of the facility.

In variations, the congestion monitoring component 120 queries the service data store 116 for users that have a current position that overlaps with a predetermined range of geographic coordinates, where the predetermined range of geographic coordinates can correspond to areas near egress points of the facility.

By way of example, in an airport, the predetermined range of geographic coordinates for an area that is to be monitored for congestion can correspond to (i) a baggage claim area, (ii) areas in front of exit doors of the airport, (iii) areas just outside or next to the exit doors, and/or (iv) any area within a geographic region, inside or outside of the airport, where users are likely to traverse in order to reach a pickup or rendezvous area where the user can receive transport services or other related resources. In a stadium or events center, the predetermined range of geographic coordinates can correspond to hallway regions in front of exit doors, regions near escalators that lead to exit doors, regions in front of elevators that are used to reach exit doors, etc. In some variations, the mass-person facility 15 can be associated with a profile and/or layout that identifies areas within or near the facility where congestion is to be monitored. Accordingly, the determination of areas where congestion monitoring occurs can be specific to the particular configuration, layout and use of the mass-person facility 15.

In examples, the congestion monitoring component 120 quantifies the determined congestion level as a congestion value 123. The congestion value 123 can be specific for individual areas of the mass-person facility which is being monitored for congestion. The congestion value 123 can be based at least in part on the number of persons that are present within the area of the geographic region 20. The area monitored for congestion can be predetermined defined by a range of geographic coordinates. Further, the congestion monitoring component 120 can make a determination as to whether the congestion level for the mass-person facility 15 exceeds a threshold value. In some examples, the threshold value can be based at least in part on a size of the facility 15, as well as a size and/or number of egress points 11 which are actively used by persons to exit the facility. Accordingly, the threshold value can be specific to the mass-person facility 15, based on factors such as the capacity and available egress flow of the facility.

Still further, in other variations, the congestion monitoring component 120 can monitor the mass-person facility 15, or portion thereof, to detect when congestion arises. In this way, the determination of congestion (when congestion exceeds threshold levels) can be a dynamic determination, made at any time and for any part or segment of the mass-person facility.

Congestion Scoring/Weighting Factors

Examples further recognize that in some situations, congestion can arise outside of the mass-person facility 15, where the congestion impacts the ability of users to fully exit from the facility, and can also impact the ability of a user to receive transport services. For example, in the context of an airport, the curbside pickup area for arriving flights, which is typically just outside the exit doors, can become congested when too many users use the same exit door to go outside onto the adjacent curbside pickup area. If the curbside congestion is upstream, the congestion can impact the ability of other users who may be further down the curbside pickup area from receiving transport or meeting rides. As another example, in the context of an amusement park or sporting event, congestion can quickly develop in the parking lot, particularly when the event is nearing an end.

Further, in many scenarios, the mass-person facility 15 can exhibit crowds that are moving efficiently through the facility. While monitoring such areas for the number of people can indicate the presence of congestion, in many situations, the presence of a large number of people does not necessarily signify the presence of congestion. In the context of an airport, fast-moving foot traffic which would otherwise be detected as congestion can sometimes be ignored if the curbside pickup area is clear or uncongested.

Accordingly, in some examples, the determination of the congestion level with respect to a predetermined area within or near the mass-person facility 15 can be based at least in part on congestion scoring/weighting factors. In examples, the weighting factors for determining congestion can be based at least in part on the number of persons that are detected as being present i a given area. In such examples, the congestion level can be determined based at least in part on congestion scoring/weighting factors, where the congestion scoring/weighting factors are indicative of congestion, particular congestion that can affect the ability of users to exit the mass-person facility 15 and/or receive transport services.

In some examples, the congestion monitoring component 120 determines or otherwise obtains service-related congestion signals 111 from the service data store 116, and/or the transport arrangement system 130. The service-related congestion signals 111 can include, for example, requester information. The requester information can include a wait time that is estimated for users that have statuses reflecting open transport requests, where the pickup locations are within the geographic region 20 of the mass-person facility 15. As another example or variation, the congestion signals 111 can include a number of requests that have open transport requests. As an addition or variation, the service-related congestion signals 111 can include wait times of requesters that are awaiting pickup within the geographic region. The wait times can reflect the presence of congestion, such as congestion of users (or vehicles) just outside of an egress point 11. The congestion monitoring component 120 can further query the service data store 116 and/or the transport arrangement component 130 to determine whether there is a relative shortage of service providers, such that the shortage would explain the long wait times for open transport requests. If the ratio of open transport request to available drivers is otherwise expected or typical, then the existence of long wait times would weigh in favor of there being congestion impacting the ability of users to receive transport services outside of the mass-person facility.

The service-related congestion signals 111 can also include information about service providers. The congestion monitoring component 120 can access the service data store 116 to monitor the position of users that are service providers, or alternatively, users that are inside vehicles within the geographic region of the mass-person facility. If the vehicles are moving slowly, or at a standstill for a duration that exceeds a threshold, then the vehicle velocity can indicate congestion. The determination of vehicle speed can weigh in favor of there being congestion that impacts transport services outside the mass-person facility. Thus, the vehicle or travel speeds of service providers can provide a service-related congestion signal 111 for determining the congestion level. Further, in such examples, the threshold duration for vehicles to be deemed as being impacted by congestion can be based on historical patterns, particularly with respect to the impact of traffic lights. Likewise, the position of users in vehicles, and the respective speeds can be compared to historical patterns in order to determine when congestion is present that is slowing the vehicles.

Flow Manager

In examples, the flow manager 124 determines egress flow distribution parameters ("EFDP 127") based at least in part on a value of the congestion level at predetermined areas within or near the mass-person facility. The EFDP 127 can identify a target distribution profile for the use of egress points 11 by users in a congested area. In some examples, the flow manager 124 determines the EFDP 127 in response to the congestion monitoring component 120 determining that the congestion level 123 exceeds a threshold value. The EFDP 127 can identify a distribution flow of persons through a select set of egress points 11 of a mass-person facility, in response to a determination that the congestion level in designated areas that are at or near a particular egress point 11 (or set of egress points) exceeds a threshold level. By way of example, in the case where the facility is an airport, the congestion monitoring component 120 may determine that the congestion level in the baggage claim area around a set of exit doors exceeds a threshold. Upon making the determination, the flow manager 124 can use a facility profile 121 to determine which egress points 11 (e.g., exit doors) should be used to manage the exit flow of users, and by what distribution percentage or ratio. The determination can be based at least in part on the egress point(s) 11 that are most heavily used, such as an egress point that is disproportionately used as a result of its proximity to a number of people in the congested area.

In some examples, the flow manager 124 can also identify a quantity or size of a user group (or grouping) for which the EFDP 127 is to be used in managing exit flow through the area. A size or number of the grouping can be based at least in part on the determined congestion value. As an addition or alternative, the flow manager 124 can determine a time interval for which the EFDP 127 is to be used in managing exit flow. As an addition or variation, the flow manager 124 can define a condition that is to determine the duration in which the exit flow of the congested area is to be managed through implementation of the EFDP 127.

As an addition or variation, the congestion monitoring component 120 can identify which egress points 11 are heavily used, or likely to be heavily used. For example, the congestion monitoring component 120 can determine a particular egress point 11 that is likely being overused, based on the congestion level around the egress point, and/or the distance between the egress point 11 and users that are in the congested area. To further illustrate, congestion can occur in front of or outside of an exit door because the particular exit door is closest in distance to the baggage claim that is in use. Based on the determination, the congestion monitoring component 120 can identify the egress point (or set of egress points) which are being overused (e.g., where continued use is likely to extend or worsen current congestion levels). The flow manager 124 can utilize the identification of the egress point that is being overused as input for selecting one or more alternative egress points for users positioned in the congested area. Further, the flow manager 124 can determine the EFDP 127 (e.g., percentage of overall exit flow that is to use each of the selected egress points) based on the congestion value 123 detected near each egress point.

In some examples, the EFDP 127 identifies a number of persons that are to use select egress points in terms of ratios or percentages (e.g., 33% through each of 3 exit doors in a given region of an airport where congestion is detected). Further, the EFDP 127 can identify a total number of persons that are to be managed in exiting the mass-person facility 15. As an addition or variation, the EFDP 127 also identifies a duration (e.g., 1 hour) in which the EFDP is to be used in routing exit flows through egress points. Still further, over a given time interval, the flow manager 124 can update or change the EFDP 127. In variations, the ratios defined by the EFDP 127 can be applied to facilitating exit flows of persons until a time when the congestion is below the threshold value or otherwise acceptable.

In determining the EFDP 127, the flow manager 124 may utilize facility-specific information, such as the facility profile 121. The facility profile 121 can include facility maps which identify the egress points 11 of the mass-person facility 15, the areas monitored for congestion, and other information, such as historical data that identifies common and/or alternative egress routes from specific areas of the mass-user facility 15.

In examples, the flow manager 124 communicates the EFDP 127 to the communication manager 128. In turn, the communication manager 128 generates multiple sets of application content data 129, where each set of application content data 129 (i) identifies one of multiple egress points that are identified by the EFDP 127, and (ii) is transmitted to one of multiple sub-groupings of computing devices. In examples, each sub-grouping can be designated to use a particular egress point 11 of the mass-person facility 15. Accordingly, the transmitted application content data 129 can include content that instructs, guides, or navigates the user through a corresponding egress point that is associated with the transmission. In this way, application content data 129 that are transmitted to the computing devices can cause corresponding users to exit from the facility using an egress point that is selected to reduce the congestion level of the identified areas.

According to examples, the flow manager 124 generates the EFDP 127 to shape the exit flow of users from the congested area to resemble or match a target distribution profile for a set of multiple egress points. Further, the communication manager 128 generates a number of application content data transmissions which instruct, guide or navigate a corresponding number of respective users to selected egress points, such that the exit flow of users through the egress points of the facility resemble or match the target distribution profile.

In some examples, the communication manager 128 generates a quantity of application content data transmissions 129 based on the EFDP 127 (e.g., for 100 or 1000 users, etc.). In a variation, the communication manager 128 can transmit application content data 129 for a time interval that is specified by the EFDP 127. As another variation, the communication manager 128 generates the application content data 129 until one or more conditions are met. For example, the condition can specify that the application content data 129 are to be generated until the congestion monitoring component 120 determines the congestion level to be less than a second threshold. In such examples, the congestion monitoring component 120 can signal the communication manager 128 when, for example, the congestion value 123 is deemed to be less than the second threshold.

Further, the communication manager 128 can select which computing devices 10, 12 are to receive application content data that identify specific egress points 11 of the EFDP 127 based on random selection. As such, the proximity of egress points 11 to respective users can be ignored when selecting a specific egress point 11 for the user. This avoids situations where a large number of users are proximate the same egress point 11, thereby worsening or continuing the determined congestion. Still further, in some variations, the communication manager 128 can estimate the distance of individual computing devices 10, with respect to a most proximate egress point 11, as well as with respect to the egress point 11 that has been selected for the user to use. The communication manager 128 can indicate the respective differences, and provide information to the user as to the reasons why the egress point that is selected for the user can better serve that user's objective. For example, the egress point 11 that is selected for the user can be closer to a region outside of the mass user facility where rendezvousing with a service provider is less congested and easier.

In some examples, the communication manager 128 can select specific egress points 11 for users based on user-specific information. For example, the communication manager 128 can access the service data store 116 to determine a destination of the user with respect to a transport request the user intends to make. As an addition or alternative, the communication manager 128 can access a user profile store 118 to determine a destination which the user is likely to specify (e.g., such as the user's home address). Based on the determined or inferred destination address, the communication manager 128 can select the egress point 11 for the user that is in accord with the direction of travel the user will likely be taking when exiting the mass-person facility. Thus, in some examples, user-specific information can override the determination of the egress point 11 which would otherwise be made by the communication manager 128.

As another example, the communication manager 128 can access the user profile store 118 to determine profile information about the user which may make it more difficult for the user to use one or more of egress points. For example, the communication manager 128 can select the nearest egress point for the user if the profile store 118 indicates that the user has a disability or physical impairment which may hinder the user's ability to travel.

Methodology

FIG. 2 illustrates a method for managing congestion within or near a mass-person facility, according to one or more embodiments. A method such as described with an example of FIG. 2 can be performed using a network system such as described with FIG. 1. Accordingly, in describing examples of FIG. 2, reference may be made to elements of FIG. 1 for purpose of illustrating suitable elements for performing a step or sub-step being described.

In step 210, the network system 100 communicates with computing devices 10, 12 of users positioned within the geographic region 20 of a mass-person facility 15, to obtain position information from each of the computing devices 10, 12. As illustrated by FIG. 1, the network system 100 can communicate with user devices 10, shown to be located within the mass-user facility 15, as well as with user devices 12 which may be outside of the mass-user facility. Further, position information can be determined from different types of users. In some examples, users within the mass-user facility 15 can operate the respective computing devices 10 as a pre- or potential user, where such user opens the service application but does not make a service request. Rather the user can use a service provided by the network system 100, such as to navigate through the mass-person facility 15. Additionally, users can include active service users, correspond to users that utilize a service application to actively make service requests such as for transportation. As still another addition or variation, examples provide that users can include service providers. Depending on implementation, computing devices for the respective types of users can be utilized to obtain position information and perform other tasks.

As described with examples, the congestion level can be evaluated against one or more thresholds, in order to determine whether mitigation against congestion is to be implemented. In some examples, the congestion level can be expressed as a quantity, represented by congestion value 123.

In step 220, the network system 100 determines a congestion level for an area of the geographic region 20 based at least in part on the position information obtained from the computing devices of the users. In examples, the network system 100 can determine the congestion level based at least in part on a determination of a number of users that are positioned in a given area of the geographic region 20. Accordingly, the network system 100 can aggregate a number of users within the geographic region based on their respective position information. Further, the network system 100 can use the aggregated number of users to estimate the congestion level within a given area of the geographic region 20. In determining congestion level, the network system 100 can use additional signals or input. For example, the position information of users that are outside of the mass-person facility 15 can weigh in favor or against the determination of the congestion level.

In step 222, information about users outside of the mass-person facility 15 can also be used to determine the congestion level of areas within the facility 15. In examples, the presence of a large number of users just outside an egress point of the mass-person facility 15 can indicate that congestion is present within the particular egress point 11. The presence of congestion outside of the exit door, for example, can slow the flow rate of persons through the exit door, particularly when users are going outside of the facility to rendezvous with a vehicle or transport. Additionally, the position information of service providers can indicate whether vehicles or at a standstill or moving slowly. When such position information indicates that there are one or multiple slow-moving or stopped vehicles outside the mass-person facility for a threshold time, the determination can also weigh in favor of the congestion level exceeding a threshold level.

As an addition or variation, in step 224, transport service information provided by the users can be used to determine the congestion level within one or more areas of the mass-person facility 15. In a mass-user facility, users can utilize a transport arrangement service to leave the facility. Users within the mass-person facility 15 can make transport requests to receive a transport service. The wait time of the user (e.g., time between when the user makes the transport request and when the user is picked up) can be used to determine the congestion level of the geographic region 20. Likewise, the time interval for matching the user with a service provider can also be probative of the congestion level. The wait time determinations can indicate a number of requests, service providers, and speed/flow of vehicles and users outside of the facility 15. In this regard, the wait times can be used to weight the determination of the congestion level for areas within the mass-user facility 15.

Likewise, the transport service information can entail determination of vehicle speeds within the geographic region 20. The vehicle speeds can be determined by the network system 100 monitoring position information of users/requesters who enter a vehicle to receive a transport. The vehicle speeds can also be determined by the network system 100 monitoring position information of users/service providers who provide transport to users. The vehicle speeds can reflect, for example, cases when vehicles are stopped or moving slowly, such as may result when congestion builds outside of the egress points 11 of the mass-user facility 15.

In response to determining that the congestion level exceeds a threshold level, the system determines, in step 230, a target distribution profile for the use of multiple egress points of the mass-user facility 15. The determination of the target distribution profile can be based on an objective of reducing the congestion level in a congested area of the mass-person facility (e.g., area in front of and/or adjacent to a heavily used exit door). The target distribution profile can be determined with an objective of optimizing the distribution of the exit flow through a set of multiple egress points 11. As described, examples recognize that congestion can develop in mass-user facilities when users have a propensity to favor one egress point over others. This propensity can be present when, for example, a particular egress point 11 is positioned closest to a congested area where the users are positioned. In examples, when the congestion level in front of or near such egress point 11 exceeds a threshold level, the system 100 can identify multiple additional or alternative egress points 11 in the vicinity of the congested area for managing the exit flows of users from the facility.

The determination of which egress points 11 to use can be based on a variety of parameters. These parameters can include (i) the proximity of egress points that are near the congested area; (ii) the number of egress points that sufficiently close to the congested area; (iii) the size or throughput of the egress point (e.g., the size of the exit doors, the opening mechanism of the exit doors such as whether the door slide open or have a turntable etc.); and/or (iv) the desirability of a region outside of or nearby to the egress points 11. With respect to desirability, egress points 11 can be selected for guiding users based on factors such as the congestion on the area outside of the particular egress point 11, the availability of parking or vehicle stopping spaces near the particular egress point, the proximity of rendezvous locations for receiving transport services, and/or other factors with respect to the particular egress point 11.

In addition to selecting which egress points 11 to use for distributing exit flows, the determination of the target distribution profile can also select a ratio or percentage of exit flow that each of the egress points are intended to receive. For example, the exit flow of users from the congested area can be distributed evenly amongst the selected egress points 11. Alternatively, the portion of the exit flow that each egress point 11 receives can be based on factors such as the throughput through each door (e.g., based on size of type of the door used with each egress point 11, etc.).

In step 240, the network system 100 transmits application content data to individual computing devices of the plurality of computing devices, to cause corresponding users of the respective computing devices to use one of multiple egress points that is selected for that user in accordance with the target distribution profile. In examples, the network system 100 generates application content data that are communicated to computing devices 10, 12 of users, to instruct, guide and/or navigate the users to an egress point 11 that is selected for that user. When congestion is detected for a given area, multiple egress points 11 are selected to optimize the exit flow of users. The system 100 can manage the exit flows for a grouping of users, where the grouping can correspond to a predetermined number of users that are to be managed in their exit from the mass-person facility. As a variation, the grouping of users can reflect a number of users that are managed over a given time interval. For the grouping of users, a portion or sub-group can be selected for each of multiple selected egress points 11. In examples, the selection of individual users to for particular egress points 11 can be random, with the number selected for each egress point or sub-grouping reflecting the target profile distribution. In such examples, the selection of users for specific egress points can be made without consideration of the proximity of the user to one or more of the egress points 11.

As an addition or variation, the selection of individual users for specific egress points 11 can be based in part on the proximity of the selected egress point to the user. In other variations, the selection of individual users for select egress points 11 can be based on user-specific information, such as one or more service parameters (e.g., destination) of the user and/or profile information of the user.

While an example of FIG. 2 provides for the network system 100 to determine a target distribution profile for use of egress points to reduce congestion, in variations, the network system 100 can determine a target distribution profile for managed use of egress points to meet other objectives (e.g., independent of any computation of congestion). For example, the network system 100 can implement a target distribution profile to manage the use of egress points whenever a predefined undesirable condition is detected with respect to significant use of a one or more egress points as compared to others. By way of example, the network computer system 100 can determine a target distribution profile to balance the load of traffic through egress points (e.g., doors into a facility). As an example, by implementing a target distribution profile to distribute the user of egress points, a facility manager can better manage the undesirable conditions, such as one egress point being of significantly greater use than another. While such conditions may not necessarily result in congestion, distributing exit flows between select egress points in accordance with a desired target distribution profile can better balance the resources of a facility for large amounts of traffic.

Application Content Data Examples

Figures 3A, 3B, 3C:
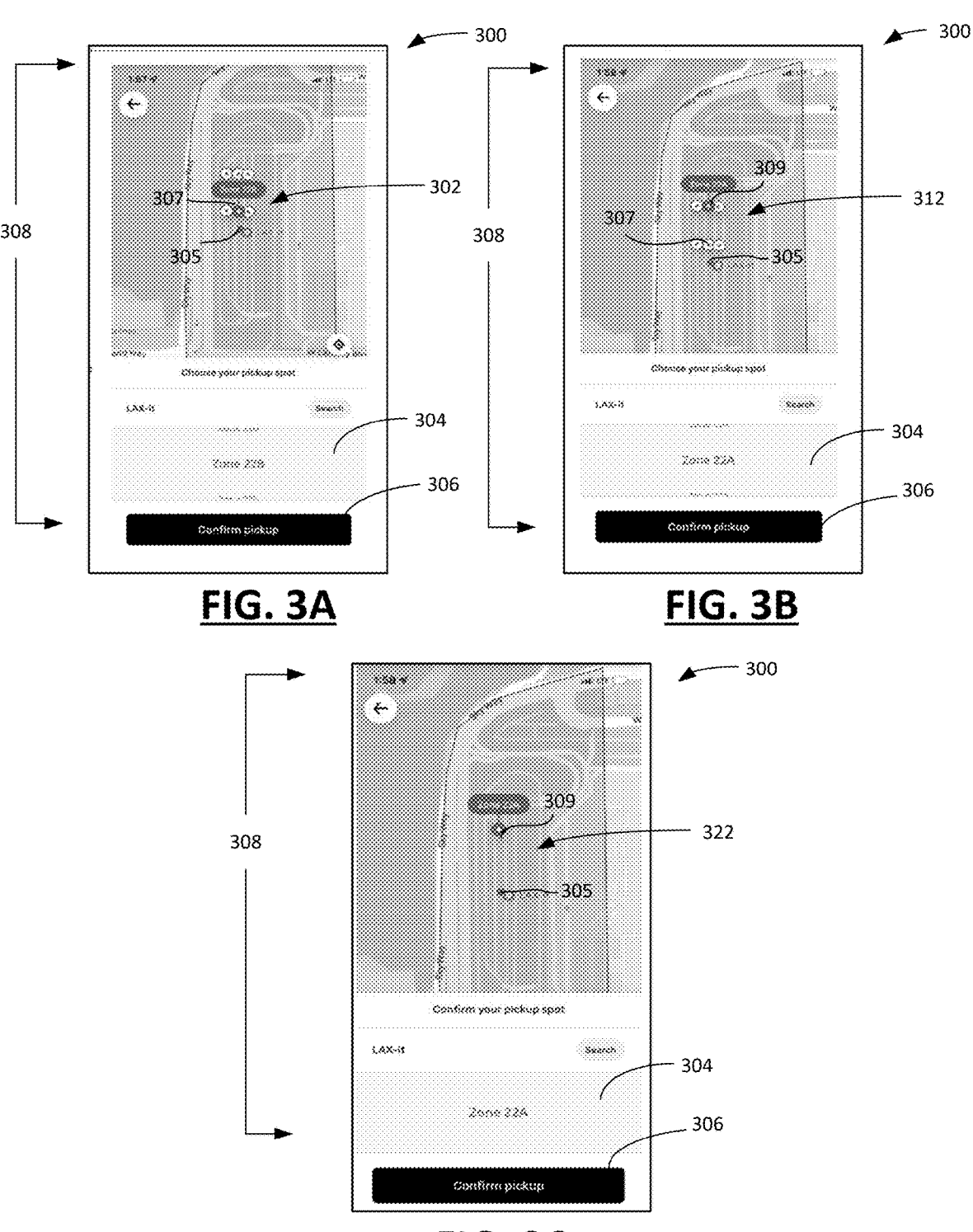
FIG. 3A through FIG. 3C illustrate example notifications which can be generated by a network system such as shown and described with FIG. 1.

FIG. 3A through FIG. 3C illustrate examples of application content data transmitted by a network system such as shown and described with FIG. 1. Accordingly, in describing examples of FIG. 3A through FIG. 3C, reference may be made to elements of FIG. 1 for purpose of illustrating suitable functionality for providing an example as described.

With reference to FIG. 3A through FIG. 3C, a user computing device 300 is shown to render different application content 302, which can be responsive to different types of application content transmissions received by the user computing device. In examples of FIG. 3A through FIG. 3C, the application content 302, 312, 322 can be generated by, for example, the communication manager 128 sending application content data 129 to users that are positioned within a geographic region of a mass-person facility, to facilitate users exiting the facility. In some variations, the application content 302, 312, 322 can be generated by default, or responsive to a programmatic input from the network system 100.

Further, in examples of FIG. 3A through FIG. 3C, the application content 302, 312, 322 can be provided in context of a user-interface 308 of a service application (e.g., request screen) for requesting transport services. As shown, the application content 302, 312, 322 can indicate the user's current location 305, as well as pickup zones 307, 309 where the user can rendezvous with a service provider. Further, the application content 302, 312, 322 can be provided in context of a map to guide or navigate the user to a selected egress point.

Accordingly, in some examples, the application content data 129 of the network system 100 can include geographical coordinates of an egress point that is selected for the user. Further, the application content 302, 312, 322 can be generated by the service application, rendering, for example, the geographic coordinate of a selected egress point for the user, where the selected egress point is determined by default and/or through transmissions of application content data 129 from the network system 100.

With reference to an example of FIG. 3A, the application content 302 can be generated in response to a transmission that is sent by the network system 100 to the computing device 300 when over-congested conditions are not detected as being present a designated area of the facility. In an example of FIG. 3A, the application content 302 identifies a most-expedient egress point for a user to utilize to reach a pickup zone (e.g., where the user can rendezvous with a vehicle). In an example shown, the most-expedient egress point can correspond to, for example, the pickup zone 307 (e.g., where the user can rendezvous with a service provider) that is closest to the user's current position. The determination can be based on, for example, a Haversine distance measurement as between the user's current position and the egress point.

In examples, the user-interface 308 can include an egress selection feature 304. In an example of FIG. 3A (no over-congested condition is detected as being present), the user can interact with egress selection feature 304 to change their pickup zone 307 (e.g., based on, for example, the user's change in position or perception of wait time). Once the user selects the egress point, the user can make a transport request, with the selected egress point corresponding to the pickup location.

With reference to an example of FIG. 3B, the application content 312 can be generated in response to the computing device 300 receiving an application content data transmission from the network system 100. For example, application content data can be sent when an over-congested condition is detected. Alternatively, the application content data can be sent when other conditions are detected, such as when one (or more) of the egress points are in greater use than other egress points in a manner that is deemed undesirable. The application content data can identify (e.g., by geographic coordinate) a selected egress point within the geographic region of the facility. In an example of FIG. 3B, the selected egress point 309 can be selected by, for example, the network system 100, which may assign the user to a particular egress point in accordance with a target distribution profile to reduce congestion at one or more areas of the corresponding facility. Accordingly, the selected egress point 309 may be further from the user than the expedient egress point 307. However, by guiding the user to the selected egress point 309, the network system 100 may also be able to guide the user away from time-consuming congestion.

In an example of FIG. 3B, the user can interact with the egress selection feature 304 of the user-interface 308 to select an alternative egress point. Thus, in an example of FIG. 3B, the application content 312 can guide the user, by making suggestions which the user can follow in order to reduce the amount of congestion at monitored areas of the facility. However, the user may choose an alternative choice, such as the closest egress point 307.

With reference to FIG. 3C, the application content 322 is generated in response to an application content transmission of the network system 100 when an over-congested condition is detected. In an example of FIG. 3C, the egress point 309 is selected for the user by the network system 100, and the egress-selection feature 304 can be locked or otherwise configured to preclude the user from selecting an alternative egress point (e.g., such as the closest egress point 307). Thus, in an example of FIG. 3C, the user-interface 308 can be implemented to force more stringent compliance by users to the target distribution profile.

Hardware Diagram

Figure 4:
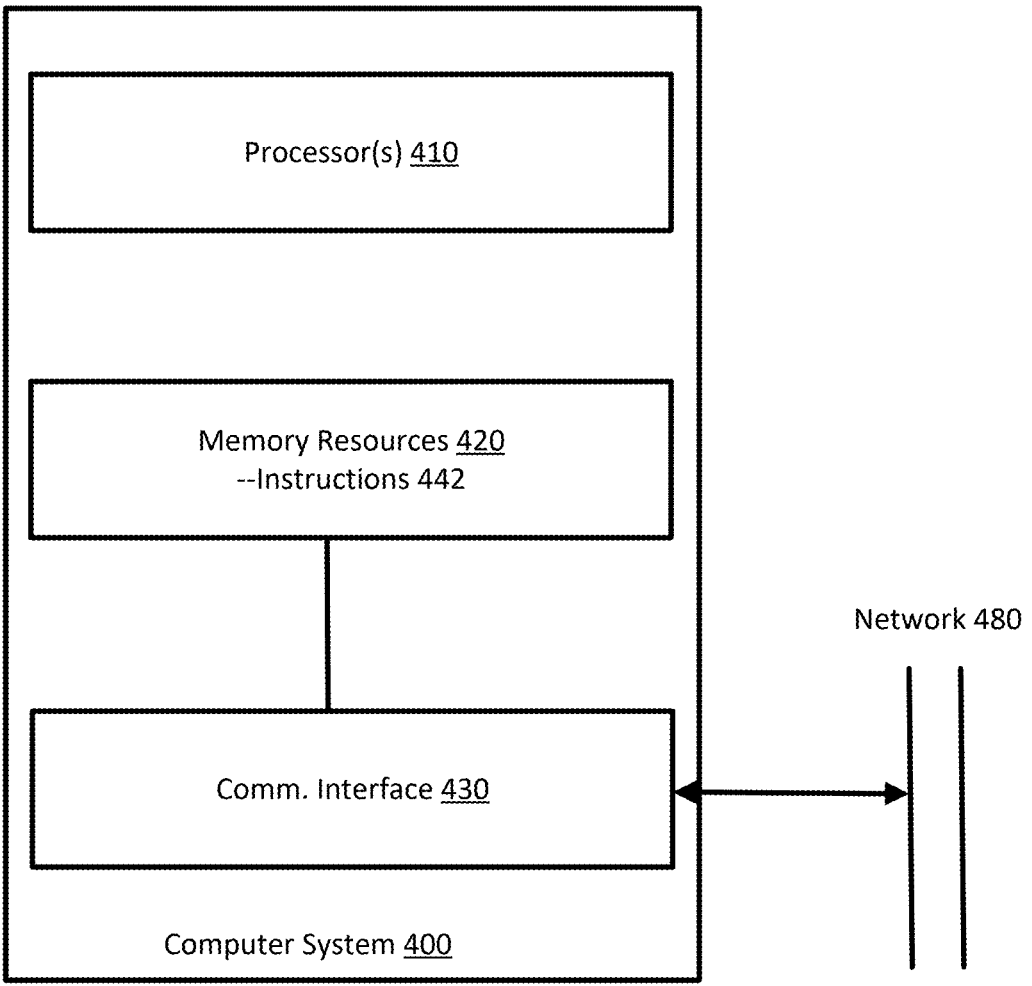
FIG. 4 is a block diagram that illustrates a computer system upon which one or more embodiments described herein can be implemented.

FIG. 4 is a block diagram that illustrates a computer system upon which one or more embodiments described herein can be implemented. A network system such as described an example of FIG. 1 can be implemented using a computing system 400 of FIG. 4. Further, an example method of FIG. 2 can be implemented using the computing system 400.

In one implementation, the computer system 400 includes one or more processors 410, memory resources 420, and a communication interface 430. The computer system 400 includes at least one processor 410 for processing information. The memory resources 420 may include a random access memory (RAM) or other dynamic storage device, for storing information and instructions to be executed by the processor(s) 410. The memory resources 420 also may be used for storing temporary variables or other intermediate information during execution of instructions to be executed by the processor(s) 410. The computer system 400 may also include other forms of memory resources, such as static storage devices for storing static information and instructions for the processor 410. The memory resources 420 can store information and instructions, including instructions 442 for communicating with user computing devices to receive position information, and for transmitting application content data to user devices 10, 12.

The communication interface 430 can enable the computer system 400 to communicate with one or more networks 480 (e.g., cellular network) through use of the network link (wireless or wireline). Using the network link, the computer system 400 can communicate with one or more other computing devices and/or one or more other servers or data centers. In some variations, the computer system 400 can receive service requests from requester devices via the network link 480. Additionally, the computer system 400 can receive information from provider devices, from which forecasts of provisioning levels, location bias and other aspects described herein may be determined.

Examples described herein are related to the use of the computer system 400 for implementing the techniques described herein. According to one embodiment, those techniques are performed by the computer system 400 in response to the processor 410 executing one or more sequences of one or more instructions contained in the memory resource 420. Such instructions may be read into a main memory from another machine-readable medium, such as a storage device. Execution of the sequences of instructions contained in the main memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

CONCLUSION

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computer system comprising:
   one or more processors;
   a memory to store a set of instructions;
   wherein the one or more processors access the set of instructions stored in the memory to perform operations that include:

communicating, over one or more networks, with a plurality of computing devices positioned within a geographic region where a mass-person facility is located, to obtain position information from each of the plurality of computing devices, each computing device of the plurality of computing devices being operated by a corresponding user of a plurality of users;

determining a congestion level in an area of the geographic region, based at least in part on the position information obtained from at least some of the plurality of computing devices;

in response to determining that the congestion level exceeds a threshold level, determining a target distribution profile that specifies an exit flow for each egress point of multiple egress points to reduce the congestion level at one or more egress points of the multiple egress points; and transmitting, over the one or more networks, based at least in part on the target distribution profile, application content data to at least some of the plurality of computing devices, the application content data causing respective computing devices to display information that identifies one of the multiple egress points that a corresponding user of the computing device is to use when exiting the mass-person facility.

2. The network computer system of claim 1, wherein the operations further comprise:

communicating, over one or more networks, with multiple computing devices positioned outside of the mass-person facility to obtain position information from each of the multiple computing devices; and wherein determining the congestion level within the mass-person facility about one or more points of egress is based at least in part on the position information obtained from each of the multiple computing devices that are positioned outside of the mass-person facility.

3. The network computer system of claim 2, wherein the multiple computing devices positioned outside of the mass-person facility include one or more driver devices, each of the one or more driver devices being operated by a corresponding user of a vehicle that is within a threshold distance of the mass-person facility.

4. The network computer system of claim 3, wherein the operations further comprise:

determining a velocity of each of the one or more driver devices based on the position information obtained from each of the one or more driver devices; and wherein determining the congestion level within the mass-person facility is based at least in part on the determined velocity of each of the one or more driver devices.

5. The network computer system of claim 3, wherein the operations further comprise:

based on the position information obtained from each of the one or more driver devices, determining whether any of the one or more driver devices are stagnant in a throughway for more than a threshold duration.

6. The network computer system of claim 1, wherein the operations further comprise:

communicating, over the one or more networks, with multiple requester computing devices positioned outside of the mass-person facility to obtain position information from each of the multiple computing devices, each of the requester computing devices being operated by a corresponding user that has requested a transport service; and determining a wait time until pickup for the corresponding user of each of the multiple requester computing devices.

7. The network computer system of claim 6, wherein the operations further comprise:

determining the congestion level is based at least in part on the wait time until pickup for each of the multiple requester computing devices.

8. The network computing system of claim 1, wherein transmitting application content data to at least some of the plurality of computing devices of the plurality of computing devices includes transmitting the application content data to at least some of the plurality of computing devices of a grouping of computing devices, the application content data identifying, for at least some computing devices of the grouping, one of the multiple egress points for a corresponding user of the computing device to use.

9. The network computing system of claim 8, wherein each of multiple sub-groupings of the grouping of computing devices identifies a corresponding egress point of the multiple egress point, wherein a number of computing devices that comprise each of the multiple sub-groupings is based on the target distribution profile.

10. The network computing system of claim 9, wherein the operations include selecting individual computing devices of the plurality of computing devices for individual sub-groupings of the multiple sub-groupings in accordance with the target distribution profile.

11. The network computing system of claim 10, wherein selecting individual computing devices of the plurality of computing devices to one of the sub-groupings is based on a user profile.

12. The network computing system of claim 9, wherein selecting individual computing devices of the plurality of computing devices to one of the sub-groupings is random.

13. The network computing system of claim 9, wherein selecting individual computing devices of the plurality of computing devices to one of the sub-groupings is performed independent of a proximity of the individual computing device to any one of the multiple egress points.

14. A non-transitory computer-readable medium that stores instructions, which when executed by one or more processors of a network computer system, cause the network computer system to perform operations that include:

communicating, over one or more networks, with a plurality of computing devices positioned within a geographic region where a mass-person facility is located, to obtain position information from each of the plurality of computing devices, each computing device of the plurality of computing devices being operated by a corresponding user of a plurality of users;

determining a congestion level in an area of the geographic region, based at least in part on the position information obtained from at least some of the plurality of computing devices;

in response to determining that the congestion level exceeds a threshold level, determining a target distribution profile that specifies an exit flow for each egress point of multiple egress points to reduce the congestion level at one or more egress points of the multiple egress points; and transmitting, over the one or more networks, based at least in part on the target distribution profile, application content data to at least some of the plurality of computing devices, the application content data causing respective computing devices to display information that identifies one of the multiple egress points that a corresponding user of the computing device is to use when exiting the mass-person facility.

15. The non-transitory computer readable medium of claim 14, wherein the operations further comprise:

communicating, over one or more networks, with multiple computing devices positioned outside of the mass-person facility to obtain position information from each of the multiple computing devices; and wherein determining the congestion level within the mass-person facility about one or more points of egress is based at least in part on the position information obtained from each of the multiple computing devices that are positioned outside of the mass-person facility.

16. The non-transitory computer readable medium of claim 15, wherein the multiple computing devices positioned outside of the mass-person facility include one or more driver devices, each of the one or more driver devices being operated by a corresponding user of a vehicle that is within a threshold distance of the mass-person facility.

17. The non-transitory computer readable medium of claim 16, wherein the operations further comprise:

determining a velocity of each of the one or more driver devices based on the position information obtained from each of the one or more driver devices; and wherein determining the congestion level within the mass-person facility is based at least in part on the determined velocity of each of the one or more driver devices.

18. The non-transitory computer readable medium of claim 16, wherein the operations further comprise:

based on the position information obtained from each of the one or more driver devices, determining whether any of the one or more driver devices are stagnant in a throughway for more than a threshold duration.

19. The non-transitory computer readable medium of claim 14, wherein the operations further comprise:

communicating, over the one or more networks, with multiple requester computing devices positioned outside of the mass-person facility to obtain position information from each of the multiple computing devices, each of the requester computing devices being operated by a corresponding user that has requested a transport service; and determining a wait time until pickup for the corresponding user of each of the multiple requester computing devices.

20. A computer-implemented method comprising:

communicating, over one or more networks, with a plurality of computing devices positioned within a geographic region where a mass-person facility is located, to obtain position information from each of the plurality of computing devices, each computing device of the plurality of computing devices being operated by a corresponding user of a plurality of users;

determining a congestion level in an area of the geographic region, based at least in part on the position information obtained from at least some of the plurality of computing devices;

in response to determining that the congestion level exceeds a threshold level, determining a target distribution profile that specifies an exit flow for each egress point of multiple egress points to reduce the congestion level at one or more egress points of the multiple egress points; and transmitting, over the one or more networks, based at least in part on the target distribution profile, application content data to at least some of the plurality of computing devices, the application content data causing respective computing devices to display information that identifies one of the multiple egress points that a corresponding user of the computing device is to use when exiting the mass-person facility.

* * * * *